(12) United States Patent
Kveton et al.

(10) Patent No.: US 8,625,860 B2
(45) Date of Patent: Jan. 7, 2014

(54) ADAPTIVE FACE RECOGNITION USING ONLINE LEARNING

(75) Inventors: Branislav Kveton, San Jose, CA (US); Kenton M. Lyons, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 13/078,924

(22) Filed: Apr. 1, 2011

(65) Prior Publication Data

US 2012/0250952 A1    Oct. 4, 2012

(51) Int. Cl.
*G06K 9/00*    (2006.01)

(52) U.S. Cl.
USPC .......... 382/118; 382/115; 382/164; 382/162; 382/254; 382/288; 382/293; 382/269

(58) Field of Classification Search
CPC .......... G06K 9/00221; G06K 9/00295; G06K 9/00302; G06K 9/00677
USPC .......... 382/118, 115, 164, 162, 254, 288, 293; 707/769
See application file for complete search history.

(56) References Cited

U.S. PATENT DOCUMENTS

| | | | |
|---|---|---|---|
| 7,881,505 B2 * | 2/2011 | Schneiderman et al. | 382/118 |
| 2005/0157952 A1 * | 7/2005 | Gohda et al. | 382/305 |
| 2009/0060290 A1 * | 3/2009 | Sabe et al. | 382/118 |
| 2010/0142762 A1 * | 6/2010 | Morita | 382/115 |
| 2011/0182482 A1 * | 7/2011 | Winters et al. | 382/116 |
| 2012/0250950 A1 * | 10/2012 | Papakipos et al. | 382/118 |

* cited by examiner

*Primary Examiner* — Mike Rahmjoo
(74) *Attorney, Agent, or Firm* — Caven & Aghevli LLC

(57) ABSTRACT

In one embodiment an electronic device comprises an input/output module, a memory coupled to the input/output module, and logic to store a first image of a face in the memory module, associate an identity with the first image of a face, subsequently collect a second image of a face, determine a correlation between features on the first image of a face and the second image of a face, and store the correlation between the first image and the second image. Other embodiments may be described.

10 Claims, 4 Drawing Sheets

ADAPTIVE FACE RECOGNITION USING ONLINE LEARNING

RELATED APPLICATIONS

None.

BACKGROUND

The subject matter described herein relates generally to the field of electronic devices and more particularly to a system and method to implement face recognition using electronic devices.

Electronic devices such as, e.g., computer systems, present security risks associated with unauthorized access of said computer systems. By way of example, unauthorized users of computer systems may access restricted files and/or resources, or engage in fraudulent electronic commerce using the electronic device. Portable electronic devices such as, e.g., mobile phones, personal digital assistants (PDAs) and laptop computers may be misplaced and/or stolen, and therefore have magnified security risks associated with the unauthorized use of electronic devices.

Many electronic devices include one or more cameras integrated into the hardware of the device. This presents the opportunity to use image recognition such as facial recognition as a component of a security regime. Accordingly systems and techniques for image recognition and particularly for face recognition in electronic devices may find utility.

BRIEF DESCRIPTION OF THE DRAWINGS

The detailed description is described with reference to the accompanying figures.

DETAILED DESCRIPTION

Described herein are exemplary systems and methods to implement face recognition in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
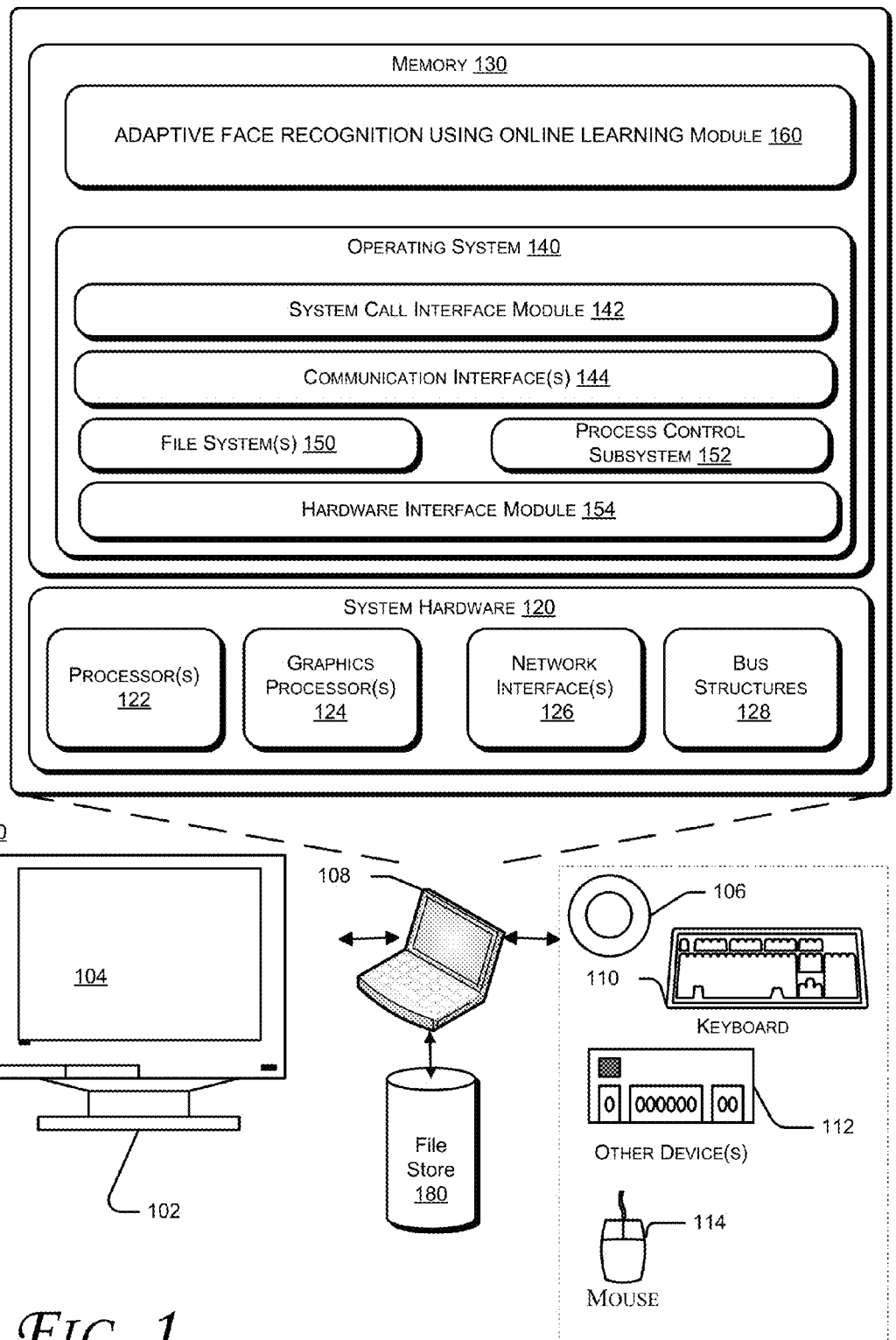
FIG. 1 is a schematic illustration of an exemplary electronic device which may be adapted to implement in accordance with some embodiments.

FIG. 1 is a schematic illustration of an exemplary system 100 which may be adapted to implement face recognition techniques in accordance with some embodiments. In one embodiment, system 100 includes an electronic device 108 and one or more accompanying input/output devices including a display 102 having a screen 104, one or more cameras 106, a keyboard 110, one or more other I/O device(s) 112, and a mouse 114. The other I/O device(s) 112 may include a touch screen, a voice-activated input device, a track ball, a geolocation device, an accelerometer/gyroscope and any other device that allows the system 100 to receive input from a user.

In various embodiments, the electronic device 108 may be embodied as a personal computer, a laptop computer, a personal digital assistant, a mobile telephone, an entertainment device, or another computing device. The particular implementation of the electronic device is not critical. The electronic device 108 includes system hardware 120 and memory 130, which may be implemented as random access memory and/or read-only memory. A file store 180 may be communicatively coupled to computing device 108. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated into the packaging of processor(s) 122, onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on computing device 108.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

In some embodiments memory 130 comprises a face recognition module 160 which comprises logic to implement facial recognition techniques. In one embodiment, the face recognition module 160 may be embodied as logic instructions stored in the computer readable memory module 130 of the system 100. In other embodiments the face recognition module 160 may be reduced to firmware which may be stored with a basic input/output system (BIOS) for the system 100, or to hardwired logic circuitry, e.g., an integrated circuit (IC). Additional details about the operations implemented by graphics processor selection module are described below.

Having described various structures of an electronic device adapted to implement face recognition techniques, aspects of face recognition techniques will be explained with reference to FIGS. 2-3, which are flowcharts illustrating operations in a method to implement transaction integrity in accordance with some embodiments. In some embodiments the operations depicted in the flowcharts of FIGS. 2-3 may be implemented by the face recognition module 160.

Figure 2:
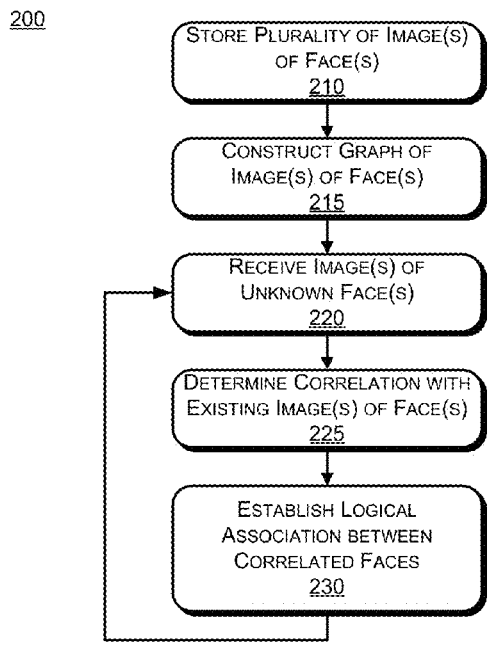
FIGS. 2-3 are flowcharts illustrating operations in a method to implement transaction integrity in accordance with some embodiments.
Figure 3:
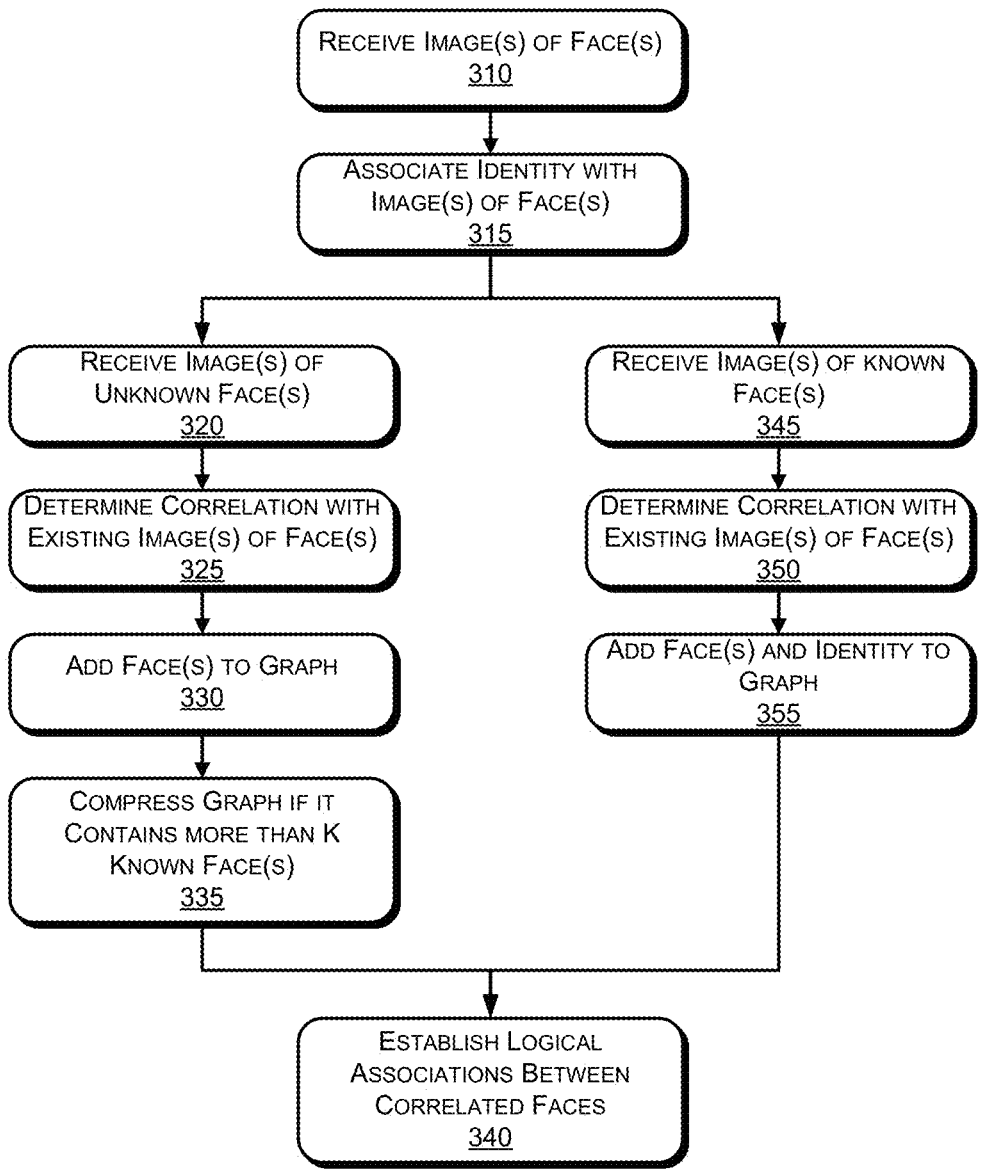

FIG. 2 is a flowchart illustrating high-level operations of face recognition techniques implemented by face recognition module 160. Referring to FIG. 2, at operation 210 the face recognition module 160 stores a plurality of images of faces in a portion of memory 130. In some embodiments at least a subset of the plurality of faces have an identity associated with the image of the face. At operation 215 the images of faces are stored in memory in a virtual graph format such that the faces are positioned as nodes on the graph and images which have sufficiently high correlations for facial features are logically linked on the graph (See, FIG. 4). One skilled in the art will recognize that the graph may be implemented as a virtual constructed stored in the memory module 130.

At operation 220 the face recognition module 160 receives one or more images of unknown faces. At operation 225 the face recognition module 160 determines a correlation between features of the received image of an unknown face or faces, and at operation 230 the face recognition module 160 establishes a logical connection between the received image of an unknown face and one or more images in the graph. One skilled in the art will recognize that the operations of FIG. 2 may be implemented iteratively, resulting in an expanding graph which correlates images of faces.

Operations implemented by the face recognition module 160 will be explained in greater detail with reference to FIG. 3. Referring to FIG. 3, at operation 310 the face recognition module 160 receives one or more images of a face or faces. By way of example, in some embodiments the images by be acquired by an input/output device such as camera 106 on electronic device 108 and stored in memory 130, where they can be accessed by face recognition module 160.

At operation 315 an identity may be associated with at least one image of a face received in operation 310. By way of example, a user of the electronic device may input one or more images of his or her face to the electronic device via camera 106 and may associate his or her identity by entering his or her name via a keyboard 112. The image(s) and name(s) may be stored in logical association in the memory 130 or the file store 180 of electronic device. Alternatively, a file comprising images logically associated with identities may be received in the electronic device, e.g., via a network interface 124, and stored in the memory 130 or file store 180 of electronic device.

At operation 320 the face recognition module 160 receives one or more images of unknown faces. By way of example, a user of the electronic device may input additional images of his or her face to the electronic device via camera 106. Alternatively, a file comprising facial images which are not logically associated with identities may be received in the electronic device, e.g., via a network interface 124, and stored in the memory 130 or file store 180 of electronic device.

At operation 325 the face recognition module 160 analyzes the received facial images and determines a correlation between the unknown images and one or more facial images stored in the memory 130 or the file store 180 of electronic device. By way of example, in some embodiments images of faces may be stored in a data adjacency graph (FIG. 4) in the memory 130 or the file store 180 of electronic device. The vertices of the data adjacency graph are images of the faces and the weights on its edges are a measure of the correlation between selected facial features.

At operation 330, the images of unknown faces are added to the data adjacency graph (FIG. 4) as new unlabeled vertices. The vertices are connected to the data adjacency graph by edges. The weights on the edges are correlations, which are computed at operation 325.

At operation 335, if the data adjacency graph (FIG. 4) contains more than k unlabeled vertices, the set of unlabeled vertices in the graph is compressed to no more than k vertices such that the new vertices cover (approximately) all original vertices. This is essential to make the time complexity of operation 340 independent of the number of all previously seen faces. The parameter k controls the quality of the approximation. Higher values of k result in better approximations but also higher computational costs (and vice versa). One way of compressing the graph efficiently and with theoretical guarantees is by using the online k-center clustering algorithm of Charikar et al. (1997).

At operation 340, the structure of the data adjacency graph (FIG. 4) is used to establish logical associations between correlated faces. One way of inferring the logical associations is to compute the harmonic function solution:

$$l_u = (L_{uu} + \gamma_g I)^{-1} W_{ul} l_l \qquad \text{Eq. 1}$$

where l is the vector of predictions, L is the Laplacian of the data adjacency graph W, which is represented by a matrix W of pairwise similarities, and u and l are the sets of labeled and unlabeled vertices in the graph W, respectively. The parameter $\gamma_g$ controls the quality of identity predictions. The higher the value of $\gamma_g$, the higher the precision and the lower the recall (and vice versa). The i-th element of the vector l represents the probability that the i-th vertex in the data adjacency graph W corresponds to a person whose face is registered in the graph.

At operation 345 the face recognition module 160 receives one or more images of known faces. By way of example, a user of the electronic device may input additional images of his or her face to the electronic device via camera 106. Alternatively, a file comprising facial images which are not logically associated with identities may be received in the electronic device, e.g., via a network interface 124, and stored in the memory 130 or file store 180 of electronic device.

At operation 350 the face recognition module 160 analyzes the received facial images and determines a correlation between the known images and one or more facial images stored in the memory 130 or the file store 180 of electronic device. By way of example, in some embodiments images of faces may be stored in a data adjacency graph (FIG. 4) in the memory 130 or the file store 180 of electronic device. The vertices of the data adjacency graph are images of the faces and the weights on its edges are a measure of the correlation between selected facial features.

At operation 355, the images of known faces are added to the data adjacency graph (FIG. 4) as new labeled vertices. The vertices are connected to the data adjacency graph by edges. The weights on the edges are correlations, which are computed at operation 350. In addition, the corresponding entry of the prediction vector l is set to 1. In particular, $l_i=1$ whenever one of the known and newly added faces was added as the vertex i. This means that the probability that the i-th vertex in the graph corresponds to a person whose face is registered in the graph is 1.

Figure 4:
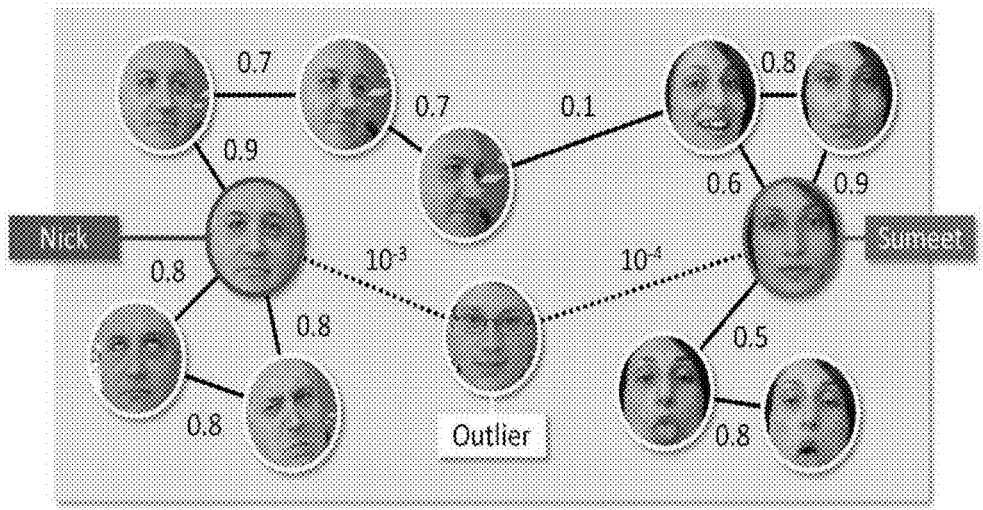
FIG. 4 is a schematic illustration of a face association graph constructed in accordance with face recognition techniques in accordance with some embodiments.

Control then passes back to operation 310 and the face recognition module waits to receive more images of faces to implement an interactive process by which new images may be added to the graph depicted in FIG. 4 and correlated with existing pictures on the graph. This provides a mechanism by which an electronic device can learn to recognize faces. Further, the technique allows the electronic device to accommodate changes in face shape, orientation, and changes in lighting conditions.

Figure 5:
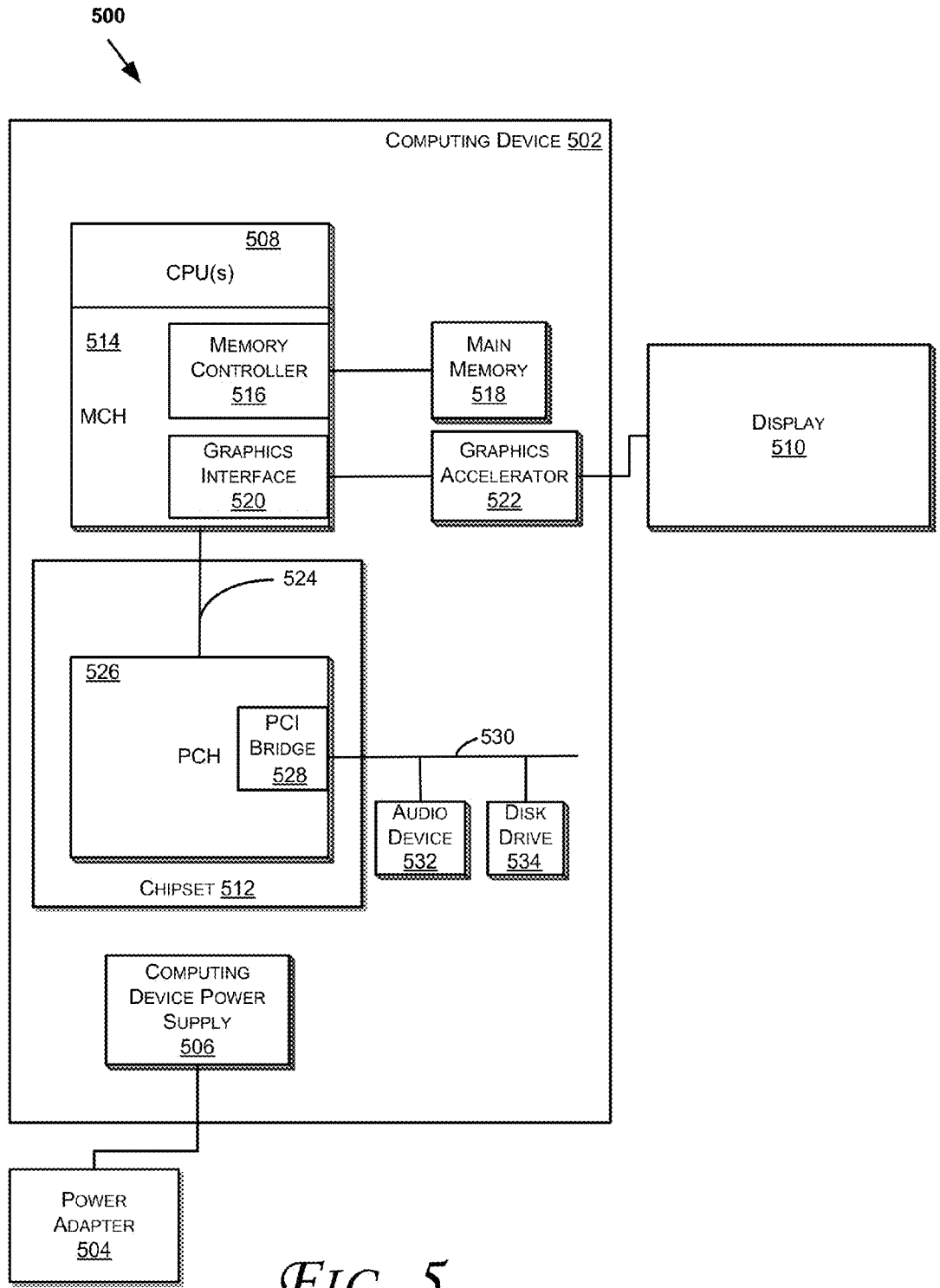
FIG. 5 is a schematic illustration of an electronic device which may be adapted to implement client hardware authenticated transactions accordance with some embodiments.

As described above, in some embodiments the electronic device may be embodied as a computer system. FIG. 5 is a schematic illustration of a computer system 500 in accordance with some embodiments. The computer system 500 includes a computing device 502 and a power adapter 504 (e.g., to supply electrical power to the computing device 502). The computing device 502 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 502 (e.g., through a computing device power supply 506) from one or more of the following sources: one or more battery packs, an alternating current (AC) outlet (e.g., through a transformer and/or adaptor such as a power adapter 504), automotive power supplies, airplane power supplies, and the like. In some embodiments, the power adapter 504 may transform the power supply source output (e.g., the AC outlet voltage of about 110 VAC to 240 VAC) to a direct current (DC) voltage ranging between about 7 VDC to 12.6 VDC. Accordingly, the power adapter 504 may be an AC/DC adapter.

The computing device 502 may also include one or more central processing unit(s) (CPUs) 508. In some embodiments, the CPU 508 may be one or more processors in the Pentium® family of processors including the Pentium® II processor family, Pentium® III processors, Pentium® IV, CORE2 Duo processors, or Atom processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 512 may be coupled to, or integrated with, CPU 508. The chipset 512 may include a memory control hub (MCH) 514. The MCH 514 may include a memory controller 516 that is coupled to a main system memory 518. The main system memory 518 stores data and sequences of instructions that are executed by the CPU 508, or any other device included in the system 500. In some embodiments, the main system memory 518 includes random access memory (RAM); however, the main system memory 518 may be implemented using other memory types such as dynamic RAM (DRAM), synchronous DRAM (SDRAM), and the like. Additional devices may also be coupled to the bus 510, such as multiple CPUs and/or multiple system memories.

The MCH 514 may also include a graphics interface 520 coupled to a graphics accelerator 522. In some embodiments, the graphics interface 520 is coupled to the graphics accelerator 522 via an accelerated graphics port (AGP). In some embodiments, a display (such as a flat panel display) 540 may be coupled to the graphics interface 520 through, for example, a signal converter that translates a digital representation of an image stored in a storage device such as video memory or system memory into display signals that are interpreted and displayed by the display. The display 540 signals produced by the display device may pass through various control devices before being interpreted by and subsequently displayed on the display.

A hub interface 524 couples the MCH 514 to an platform control hub (PCH) 526. The PCH 526 provides an interface to input/output (I/O) devices coupled to the computer system 500. The PCH 526 may be coupled to a peripheral component interconnect (PCI) bus. Hence, the PCH 526 includes a PCI bridge 528 that provides an interface to a PCI bus 530. The PCI bridge 528 provides a data path between the CPU 508 and peripheral devices. Additionally, other types of I/O interconnect topologies may be utilized such as the PCI Express™ architecture, available through Intel® Corporation of Santa Clara, Calif.

The PCI bus 530 may be coupled to an audio device 532 and one or more disk drive(s) 534. Other devices may be coupled to the PCI bus 530. In addition, the CPU 508 and the MCH 514 may be combined to form a single chip. Furthermore, the graphics accelerator 522 may be included within the MCH 514 in other embodiments.

Additionally, other peripherals coupled to the PCH 526 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 502 may include volatile and/or nonvolatile memory.

Thus, there is described herein systems and associated methods to implement adaptive face recognition using online learning in electronic devices. In still other embodiments an electronic device, comprises an input/output module, a memory coupled to the input/output module and logic to store a plurality of images of faces in a memory module, wherein a first subset of the plurality of images have a known identity, construct a graph of the plurality of images of faces in the memory module, wherein the images of faces are positioned as nodes on the graph and images of faces which have a correlation that exceeds a threshold are linked on the graph, subsequently receive an unknown image of a face, determine a correlation between one or more features of the unknown image and one or more features on one or more images of faces in the graph and establish a logical association between the unknown image of a face and the second image of a face.

In some embodiments the electronic device may further comprise logic to determine a correlation between one or more features the images and one or more features on one or more images of faces in the graph and establish a logical association between the unknown image of a face. In further embodiments the electronic device may comprise logic to determine a distance parameter between the unknown image and an image in the graph and logic to divide the distance parameter by a heat parameter.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method, comprising:
    storing a first image of a face in a memory;
    associating an identity with the first image of a face;
    subsequently collecting a plurality of additional images of faces;
    storing the additional images in the memory;
    constructing a data adjacency graph which provides a logical link between images of faces on the graph, wherein each image of a face is represented as a node on the graph and the graph comprises correlations between images;
    determining a correlation between features on the first image of a face and one or more of the plurality of additional images of faces;
    establishing a logical association between the first image of a face and one or more of the plurality of additional images of faces by computing a harmonic function solution $\lambda_u = (L_{uu} + \gamma_g I)^{-1} W_{ul} \lambda_l$, where:

$\lambda$ is a vector of predictions;
    L is a Laplacian of the data adjacency graph (W), which is represented by a matrix (W) of pairwise similarities, and u and l are sets of labeled and unlabeled vertices in the data adjacency graph (W), respectively; and storing the correlation between the first image and the one or more of the plurality of additional images of faces.

2. The method of claim 1, wherein associating an identity with at least a first image of the face comprises receiving an identifier associated with the face via an input/output module.

3. The method of claim 1, wherein determining a correlation between features on the first image of a face and the second image of a face comprises determining a distance parameter between the first image and the second image.

4. An electronic device, comprising:
    an input/output module;
    a memory coupled to the input/output module; and
    logic to:
        store a first image of a face in the memory;
        associate an identity with the first image of a face;
        subsequently collect a plurality of additional images of faces;
        store the additional images in the memory;
        construct a data adjacency graph which provides a logical link between images of faces on the graph, wherein each image of a face is represented as a node on the graph and the graph comprises correlations between images;
        determine a correlation between features on the first image of a face and the one or more of the plurality of additional images of faces;
        establish a logical association between the first image of a face and one or more of the plurality of additional images of faces by computing a harmonic function solution $\lambda_u = (L_{uu} + \gamma_g I)^{-1} W_{ul} \lambda_l$, where:

$\lambda$ is a vector of predictions;
        L is a Laplacian of the data adjacency graph (W), which is represented by a matrix (W) of pairwise similarities, and u and l are sets of labeled and unlabeled vertices in the data adjacency graph (W), respectively; and store the correlation between the first image and the one or more of the plurality of additional images of faces.

5. The electronic device of claim 4, further comprising logic to receive an identifier associated with the face via the input/output module.

6. The electronic device of claim 4, further comprising logic to determine a distance parameter between the first image and the second image.

7. A computer program product comprising logic instruction stored on a non-transitory computer-readable medium which, when executed by a processor, configure the processor to implement a method, comprising:

storing a first image of a face in a memory;

associating an identity with the first image of a face;

subsequently collecting a plurality of additional images of faces;

storing the additional images in the memory;

constructing a data adjacency graph which provides a logical link between images of faces on the graph, wherein each image of a face is represented as a node on the graph and the graph comprises correlations between images;

determining a correlation between features on the first image of a face and one or more of the plurality of additional images of faces;

establishing a logical association between the first image of a face and one or more of the plurality of additional images of faces by computing a harmonic function solution $$\lambda_u = (L_{uu} + \gamma_g I)^{-1} W_{ul} \lambda_l, \text{ where:}$$

$\lambda$ is a vector of predictions;

L is a Laplacian of the data adjacency graph (W), which is represented by a matrix (W) of pairwise similarities, and u and l are sets of labeled and unlabeled vertices in the data adjacency graph (W), respectively; and storing the correlation between the first image and the one or more of the plurality of additional images of faces.

8. The computer program product of claim 7, wherein associating an identity with at least a first image of the face comprises receiving an identifier associated with the face via an input/output module.

9. The computer program product of claim 7, wherein determining a correlation between features on the first image of a face and the second image of a face comprises determining a distance parameter between the first image and the second image.

10. The computer program product of claim 7, wherein:

each image of a face is represented as a node on the graph;

images which have correlations that exceed the first threshold value are linked to one another on the graph; and images which have correlations does not exceed second threshold value are isolated on the graph as outliers.

* * * * *